United States Patent
Ji et al.

(10) Patent No.: US 10,078,657 B2
(45) Date of Patent: Sep. 18, 2018

(54) DETECTION OF DATA REPLICATION CONSISTENCY

(71) Applicant: International Business Machines Corporation, Armonk, NY (US)

(72) Inventors: Hai Ji, Beijing (CN); Yuan Yuan Li, Beijing (CN); Xiao Yang Yang, Beijing (CN); Chun Guang Zheng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 14/867,533

(22) Filed: Sep. 28, 2015

(65) Prior Publication Data
US 2016/0125017 A1    May 5, 2016

(30) Foreign Application Priority Data
Oct. 29, 2014  (CN) .......................... 2014 1 0594494

(51) Int. Cl.
*G06F 17/30*  (2006.01)
*G06F 11/20*  (2006.01)

(52) U.S. Cl.
CPC .... *G06F 17/30371* (2013.01); *G06F 11/2094* (2013.01); *G06F 2201/82* (2013.01)

(58) Field of Classification Search
None
See application file for complete search history.

(56) References Cited

U.S. PATENT DOCUMENTS

| 8,504,517 B2* | 8/2013 | Agrawal | G06F 17/30174 |
| | | | 707/610 |
| 8,959,052 B2* | 2/2015 | Akiyama | G06F 17/30578 |
| | | | 707/624 |

(Continued)

FOREIGN PATENT DOCUMENTS

CN    102308288 A    1/2012

OTHER PUBLICATIONS

"Foundation DB2.0"; https://foundationdb.com/documentation/developer-guide.html; Sep. 25, 2015; pp. 42.

(Continued)

*Primary Examiner* — Debbie Le
(74) *Attorney, Agent, or Firm* — Cantor Colburn LLP

(57) ABSTRACT

A method, system, and computer program product for detecting consistency between first and second data replicas is provided. Detecting consistency between data replicas includes acquiring first characteristic information of a first data replica and second characteristic information of a second data replica, the first and second characteristic information being associated with keys of the respective first and second data replicas. Detecting consistency between data replicas further include determining, based on a predetermined threshold value of a number of determination times, whether the first characteristic information is identical to the second characteristic information of the second data replica. In response to the determining that the first characteristic information and the second characteristic information are identical, whether the first data replica is consistent with the second data replica may then be confirmed.

9 Claims, 6 Drawing Sheets

(56) References Cited

U.S. PATENT DOCUMENTS

| | | | |
|---|---|---|---|
| 9,344,484 B2* | 5/2016 | Ferris | H04L 67/06 |
| 9,384,232 B2* | 7/2016 | Pittelko | G06F 11/1448 |
| 2008/0140734 A1 | 6/2008 | Wagner | |
| 2013/0151478 A1 | 6/2013 | Li et al. | |
| 2014/0032504 A1 | 1/2014 | Colab et al. | |
| 2014/0143206 A1* | 5/2014 | Pittelko | G06F 11/1448 |
| | | | 707/634 |

OTHER PUBLICATIONS

CN920140103CN1—CN OA dated Mar. 2, 2018, CN Application No. 201410594494.

* cited by examiner

DETECTION OF DATA REPLICATION CONSISTENCY

FOREIGN PRIORITY

This application claims priority to Chinese Application No. 201410594494.0 filed on Oct. 29, 2014 and all the benefits accruing therefrom under 35 U.S.C. § 119, the contents of which in its entirety are herein incorporated by reference.

BACKGROUND

The present invention relates to the field of data storage, and more specifically, to detecting consistency between data replicas stored.

SUMMARY

Embodiments include a method, system, and computer program product for detecting consistency between first and second data replicas. The embodiments include acquiring first characteristic information of a first data replica and second characteristic information of a second data replica, the first and second characteristic information being associated with keys of the respective first and second data replicas. The embodiments further include determining, based on a predetermined threshold value of a number of determination times, whether the first characteristic information is identical to the second characteristic information of the second data replica. In response to the determining that the first characteristic information and the second characteristic information are identical, the embodiments may then confirm whether the first data replica is consistent with the second data replica.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
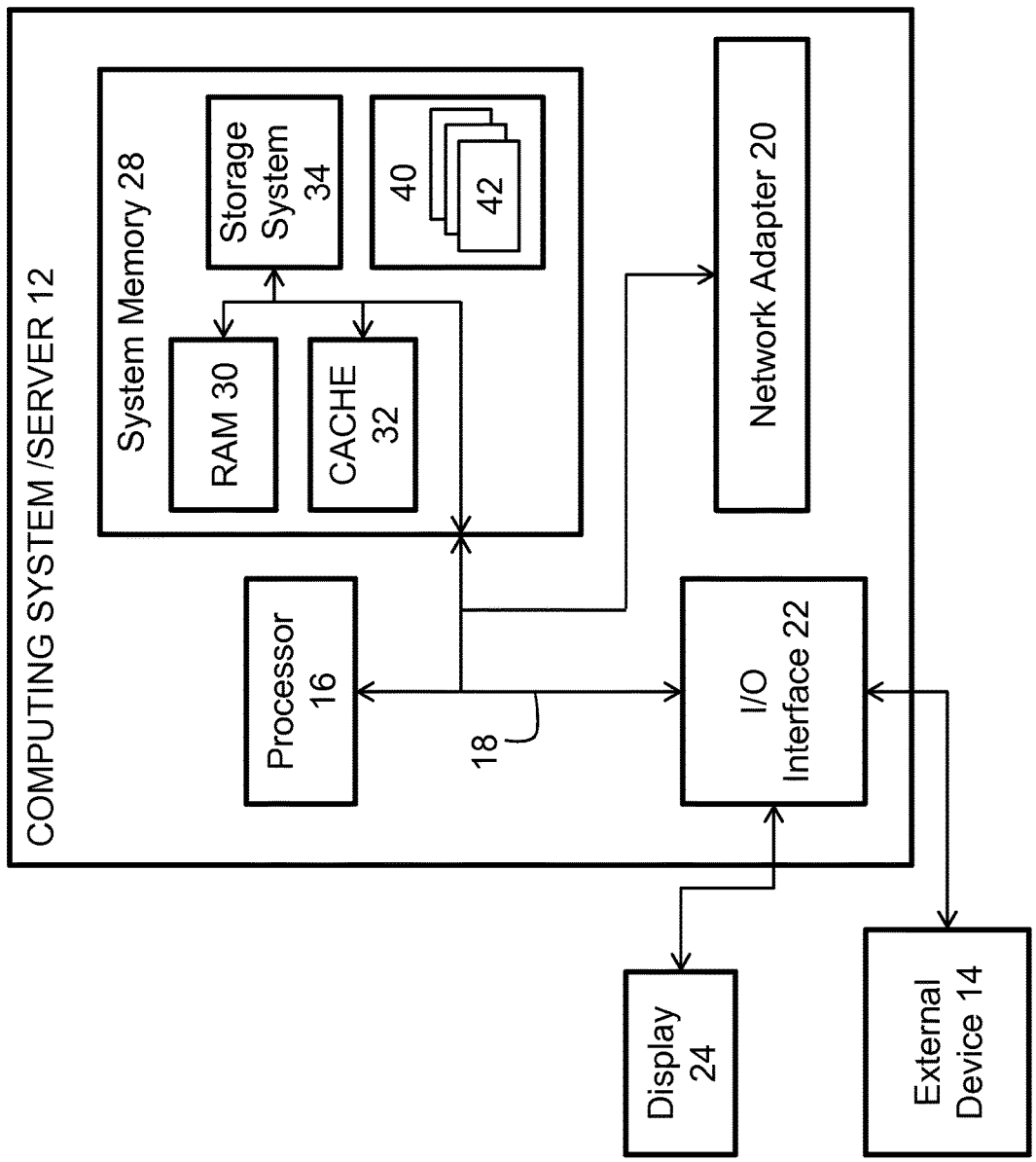
FIG. 1 depicts an exemplary computer system according to an embodiment of the present invention.

A key-value based data storage mechanism can be utilized in the data storage domain. In the key-value based data storage mechanism, data can be stored in a form of key-value pairs. Key-value pair can be referred to as a mapping, e.g., where a key is a unique keyword uniquely corresponding to each individual data entry, while a value is the data content actually stored. The key-value based data storage mechanism utilizes a hash operation map from "key" to "value." In querying, data is located based on a hash value of a "key" resulted from a hash transform, to realize a quick query. In general, with respect to the key-value based data storage mechanism, each stored data block can comprise multiple key-value pairs.

To improve data reliability with data redundancy, one data block may be replicated into several copies thereof (replicas) for storage. In this situation, it is important to guarantee consistency between those replicas of the same data block. That is, to guarantee consistency the key-value based data storage mechanism can efficiently and accurately detect whether replicas are consistent with each other. The performance of a storage system that includes the key-value based data storage mechanism is thus affected by a speed and accuracy of a consistency detection process, as well as whether or not the process needs to lock or interrupt the storage system operations.

Contemporary technologies compare data entries within various data replicas one by one to detect consistency there between. These contemporary technologies may have relatively higher accuracy, but will have a slower detection speed, because data entries must be read out from hard disks of the storage system and compared one by one, which leads to a need of locking or interrupting the storage system operations during the comparison.

Contemporary technologies also determine consistency between data replicas through comparing version information of data replicas (instead of comparing data entries one by one). That is, data replicas are considered as consistent with each other if they have consistent version information. However, there is a high probability that the data replicas have consistent version information but inconsistent contents. Thus, these contemporary technologies have a lower accuracy.

In addition, contemporary technologies also fail to provide efficient and accurate on-line detecting of the consistency between the replicas without affecting the normal operations of a storage system.

In view of the above and according to embodiments of the present invention, a method, system, and computer program product for detecting consistency between data replicas stored based on key-value is provided. The embodiments include acquiring first characteristic information of a first data replica and second characteristic information of a second data replica, the first and second characteristic information being associated with keys of the respective first and second data replicas. The embodiments further include determining, based on a predetermined threshold value of a number of determination times, whether the first characteristic information is identical to the second characteristic information of the second data replica. In response to the determining that the first characteristic information and the second characteristic information are identical, the embodiments may then confirm whether the first data replica is consistent with the second data replica.

According to various aspects of embodiments herein, the efficient and accurate online detection of replica consistency can be realized without affecting the normal operations of a storage system.

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Referring now to FIG. 1, in which an exemplary computer system/server 12 which is applicable to implement the embodiments of the present invention is shown. Computer system/server 12 is only illustrative and is not intended to suggest any limitation as to the scope of use or operability of embodiments of the invention described herein.

As shown in FIG. 1, computer system/server 12 is shown in the form of a general-purpose computing device. The components of computer system/server 12 may include, but are not limited to, one or more processors or processing units (e.g., processor 16), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the system memory 28 may include at least one program product having a set (e.g., at least one) of program modules that are configured to carry out the operations of embodiments of the invention.

Program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the operations and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via the bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
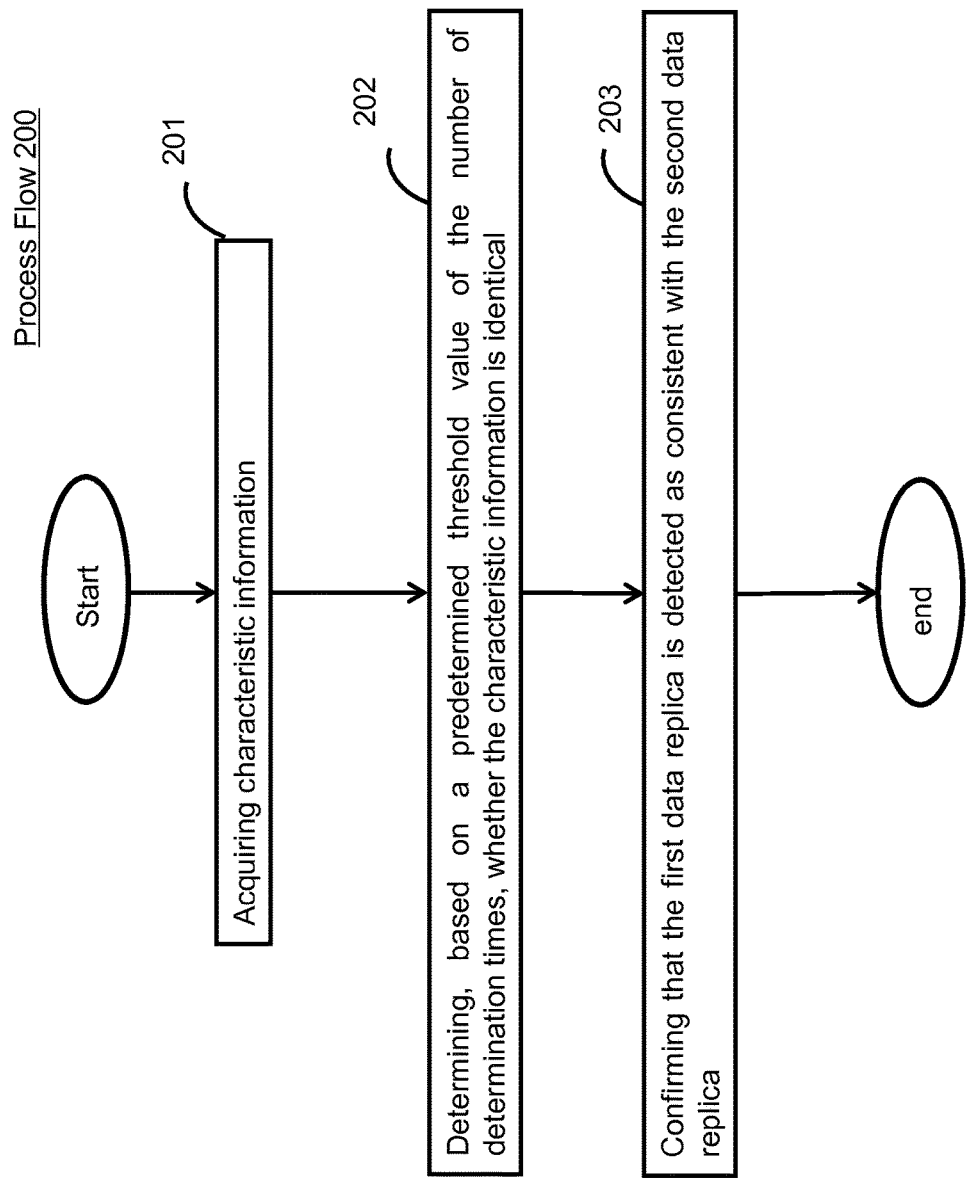
FIG. 2 depicts a flowchart of a method for detecting consistency between data replicas stored according to an embodiment of the present invention.

Referring to FIG. 2, a process flow 200 for detecting consistency between data replicas stored based on key-value according to an embodiment is shown. The process flow begins at block 201, where characteristic information of a first data replica and a second data replica is acquired. The characteristic information being associated with keys of a respective data replica and representative of the data replica. Next, at block 202, the process flow 200 continues by determining, based on a predetermined threshold value of a number of determination times, whether the first characteristic information is identical to the second characteristic information of the second data replica. Then, based at block 203, the process flow 200 confirms whether the first data replica is consistent with the second data replica. This confirmation may be in response to the determining that the first characteristic information and the second characteristic information are identical. Note that the number of determination times may not be more than the predetermined threshold value.

Figure 3:
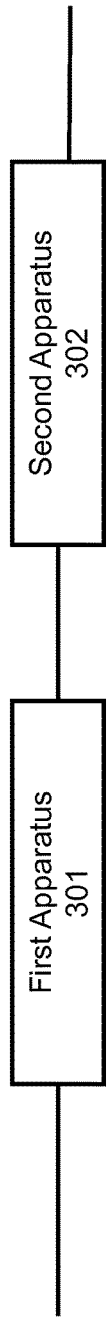
FIG. 3 depicts a block diagram of an apparatus for detecting consistency between data replicas stored according to an embodiment of the present invention.

Turning now to FIG. 3, a system 300 for detecting consistency between data replicas stored based on key-value according to an embodiment is shown. The system 300 can comprise a first apparatus 301 configured to acquire characteristic information of a first data replica and a second data replica respectively. The characteristic information can be associated with keys of a respective data replica and representative of the data replica. The system 300 can further comprise a second apparatus 302 configured to determine, based on a predetermined threshold value of the number of determination times, whether the characteristic information of the first data replica is identical to the characteristic information of the second data replica. The second apparatus 302 can further confirm that the first data replica is detected as consistent with the second data replica in response to determining the characteristic information being identical where the number of determination times not being more than the predetermined threshold value. Note that the first apparatus 301 and the second apparatus 302 can be embodied as hardware, software, or any combination thereof.

In operation, the above embodiment can efficiently and accurately perform online detection of replica consistency without affecting the normal operations of a storage system. That is, the above embodiment may determine consistency between replicas using characteristic information representative of those replicas. Because the characteristic information is associated with keys of a corresponding data replica which uniquely corresponds to data contained in the data replica, the above embodiment can guarantee a sufficient high probability of a unique correspondence between the characteristic information and the data replica, such that consistency between data replicas may be represented by consistency between the characteristic information with a sufficient high probability, resulting to a guaranteed accuracy of the detection accordingly.

Further, in this embodiment, the characteristic information is associated with keys of a corresponding data replica. Thereby, only the "key" of a key-value pair is concerned, and it is not necessary to consider its "value." Because the key and its associated information are generally stored in memory, in this embodiment, the process of acquiring characteristic information can be performed in memory without access a hard disk. Thus, characteristic information may be acquired in a very short period of time, so that an online (real-time) detection is possible during intervals between update operations (inserting, deleting, etc.) for replicas without affecting (e.g., interrupting or locking) the normal operations of the system.

Any form in which characteristic information is associated with keys of a corresponding data replica can be utilized providing that form is allowed to represent the data replica by the characteristic information. Thus, consistency between data replicas can be determined between characteristic information. That is to say, the way of the association between characteristic information and keys of a data replica can be in any form that can cause a sufficient high probability that corresponding replicas are consistent with each other when they have consistent characteristic information.

For example, characteristic information can be associated with "keys" of a data replica such that the characteristic information can be hash value sums obtained by hashing the keys of the respective data replica. Note that hash operations for identical keys will have the same hash values, while different keys will have different hash values. Therefore, two data replicas have consistent keys when the hash value sums of their keys are equal. Further, two data replica are consistent when keys of a data replica uniquely correspond to data contained in the data replica. Thereby, the accuracy of the detection can be guaranteed when the sum of key hash values is used as the characteristic information.

In another example, in the scenario that there is a hash table for each data replica in memory, the characteristic information may be the sum of various hash values in the hash table. The sum of various hash values in the hash table may be obtained through directly reading and adding the various hash values from the hash table. Reading and adding the various hash values from the hash table together increases computation speed. In the case that there are more than one hash tables corresponding to the same replica, those hash tables may be logically treated as a single combined table, from which all hash values can be read out and added to obtain the characteristic information.

Note that the hash operation and/or table utilized may be of any type. Also, note that the association between characteristic information and a data replica is not limited to the above examples. For instance, the characteristic information may also be a hash value obtained through a hashing operation performed on all or some keys of the data replica concatenated in series together.

In another embodiment, the principle of determining whether a first data replica's characteristic information is identical to a second data replica's characteristic information based on a predetermined threshold value of the number of determination times is described. For a general storage system, the following supposition is tenable with a sufficient high probability. If two data replicas are consistent with each other, a point of time when two data replicas are consistent can be sampled during a predetermined period of time within a limited number of sampling times. Further, if a point of time when two data replicas are consistent cannot be sampled during a predetermined period of time within a limited number of sampling times, the two data replicas can be considered as inconsistent. In turn, it can be confirmed that the first data replica can be detected as consistent with the second data replica in response to determining the characteristic information being identical with the number of determination times not being more than the predetermined threshold value while guaranteeing a sufficient high accuracy of the detection.

Further, as to a storage system in appropriate operation, there may be a time lag between the completions of an update operations performed on various data replicas of the same data block. Thus, a period of time is needed from the start of an update and the completion of the update performed on all data replicas. If the timing of the determination is within such a time period, an erroneous determination may occur and affect the accuracy of the detection. Furthermore, through determining based on a predetermined threshold value of the number of determination times, a period of time can be provided for various replicas to complete their update operations so that a high accuracy of the detection may be still guaranteed, even though there is a regular time lag between updating of various replicas.

Moreover, the above determining of whether a first data replica's characteristic information is identical with the second data replica's characteristic information based on a predetermined threshold value of the number of determination times may include confirming that the first data replica is detected as inconsistent with the second data replica in response to the characteristic information not being determined to be identical till the number of determination times has reached the predetermined threshold value.

In another embodiment, a determination based on a predetermined threshold value of the number of determination times may be realized through loop determination. For example, determining whether a first data replica's characteristic information is identical with the second data replica's characteristic information based on a predetermined threshold value of the number of determination times may further include repeating blocks 201, 202, and 203 of the process flow 200 in response to determining that the characteristic information is not identical where the number of determination times not being more than the predetermined threshold value.

Figure 4:
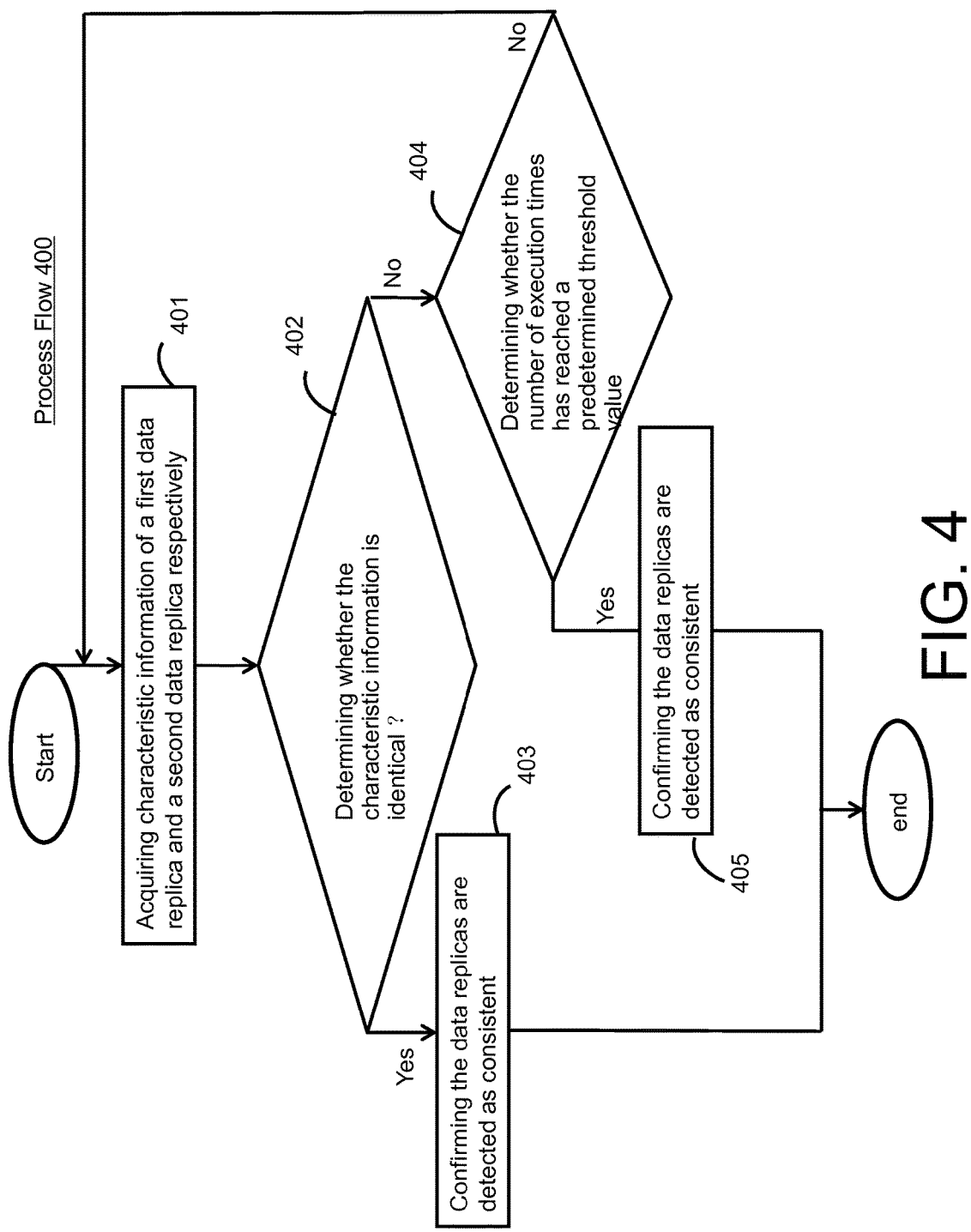
FIG. 4 depicts another flowchart of a method for detecting consistency between data replicas according to an embodiment of the present invention.

In another embodiment, in response to determining that the characteristic information is not identical where the number of determination times is not more than the predetermined threshold value, blocks 201, 202, and 203 are re-executed after a predetermined waiting time. In this way, erroneous determinations caused by time difference between updating operations of the replicas can be avoided while the detection accuracy is improved. FIG. 4 depicts a process flow 400 illustrating an embodiment through loop determination. The process flow 400 further illustrates detecting consistency between data replicas stored based on key-value pair. The process flow 400 begins at block 401, where characteristic information of a first data replica and a second data replica are acquired respectively. Note that the characteristic information can be associated with keys of a respective data replica and representative of the respective data replica. Next at block 402, the process flow 400 continues by determining whether the characteristic information of the first data replica is identical with the characteristic information of the second data replica. If the characteristic information is identical, the process flow 400 proceeds to block 403 (as indicated by the 'YES' arrow), where whether the first data replica is detected as consistent with the second data replica is confirmed. Otherwise, the process flow 400 proceeds to block 404 (as indicated by the 'NO' arrow).

At block 404, the process flow 400 continues by determining whether the number of execution times (of blocks 401 and 402) has reached a predetermined threshold value. If the number of execution times has reached a predetermined threshold value, the process flow 400 proceeds to block 405 (as indicated by the 'YES' arrow), where whether the first data replica is detected as inconsistent with the second data replica is confirmed. Otherwise, blocks 401 and 402 are re-executed immediately or after waiting for a predetermined time.

The process flow 400 of FIG. 4 is an example of implementing the embodiments of this invention through loop determination and is not limiting. For instance, in another example, instead of a loop process, the determination on characteristic information of the first and second data replicas may be executed for a predetermined threshold times. Then, a determination is made as to whether there is an identical result during the predetermined threshold number of times. If there is an identical result during the predetermined threshold number of times, a confirmation can be performed with respect to whether the first data replica is detected as consistent with the second data replica.

The average time required for executing the detection (from the beginning of the detection to the acquisition of a detection result) can depend on a time required for acquiring the characteristic information (e.g., which can mainly include a portion for calculating characteristic information and a portion for transmitting the characteristic information (through network transmission, for example)), the predetermined threshold value of the number of determination times, and/or an optional waiting time. For a general storage system, the average time can be short enough with respect to an average frequency of the system for updating various replicas in each data block, and thus on-line detection can be guaranteed without affecting the normal operations of the system. In a general storage system, each data block can be updated once on average about every 50 ms; however, the time required for acquiring characteristic information every time can range between several milliseconds to a few dozen milliseconds (which in this example is far less than the update interval). Therefore, it may be substantially guaranteed that the detection may be completed in a time interval between two update operations of the storage system when the predetermined threshold value of the number of determination times and/or the predetermined waiting time are set appropriately. In the case of a determining result of consistent data replicas, the detection may not trigger any subsequent operation, and the next update of the system can be performed regularly. Therefore, in the normal state of the storage system in which data replicas are kept consistent most of the time, the detection may not substantially affect the normal operations of the storage system.

By considering an allowed detection time and expected detection accuracy, the predetermined threshold value of the number of determination times and the predetermined waiting time can be set as need. In an example, the predetermined threshold value of the number of determination times may be 10-100. In another example, the predetermined waiting time may be 5 ms-1000 ms.

Figure 5:
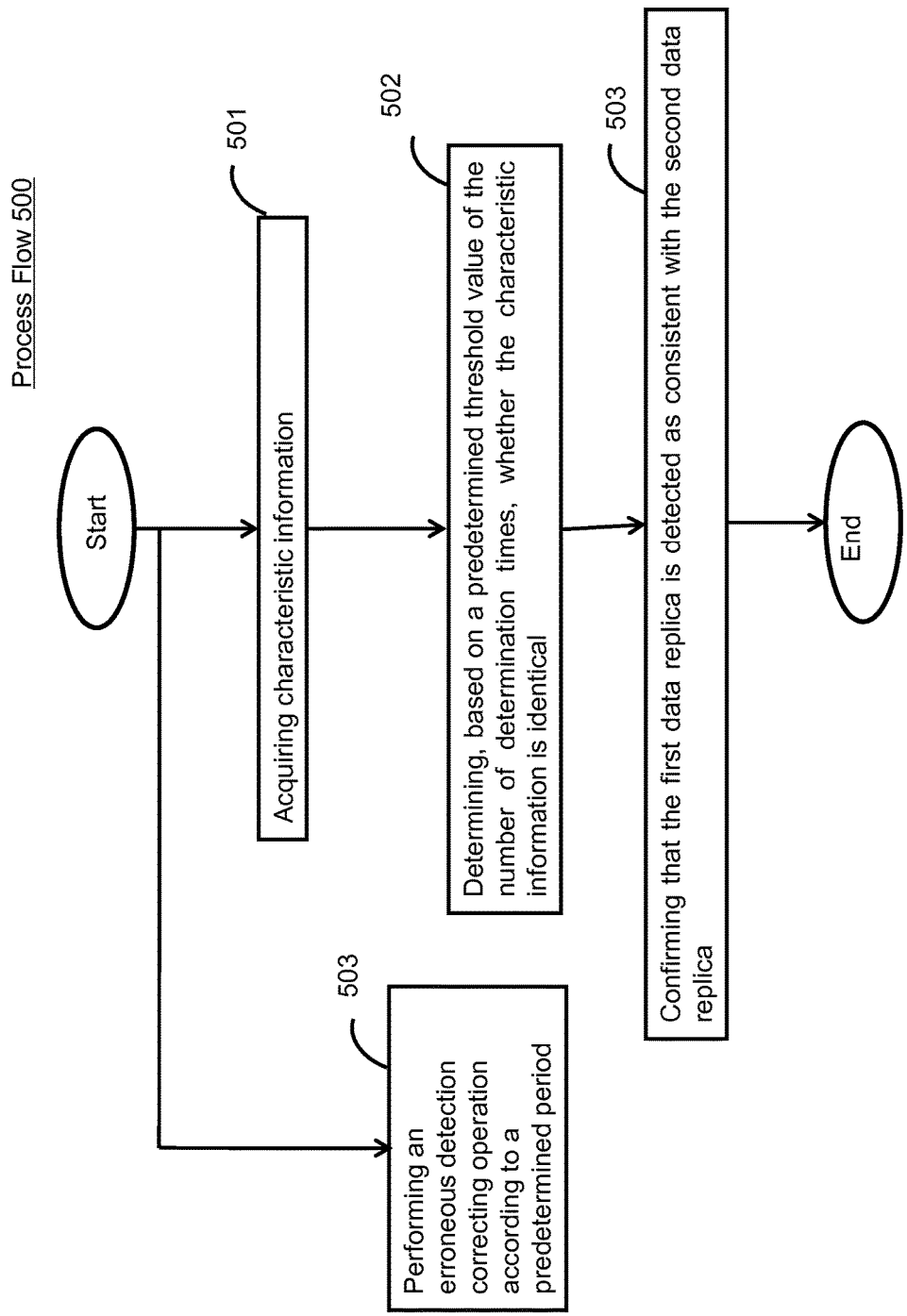
FIG. 5 depicts another flowchart of a method for detecting consistency between data replicas according to an embodiment of the present invention.

Turning now to FIG. 5, a process flow 500 for detecting consistency between data replicas stored based on key-value storage according to another embodiment is depicted. The blocks 501, 502, and 503 of the process flow 500 are similar to blocks 201, 202, and 203 of process flow 200. The process flow 500 further includes block 503, where an erroneous detection correcting operation according to a predetermined period is performed.

Figure 6:
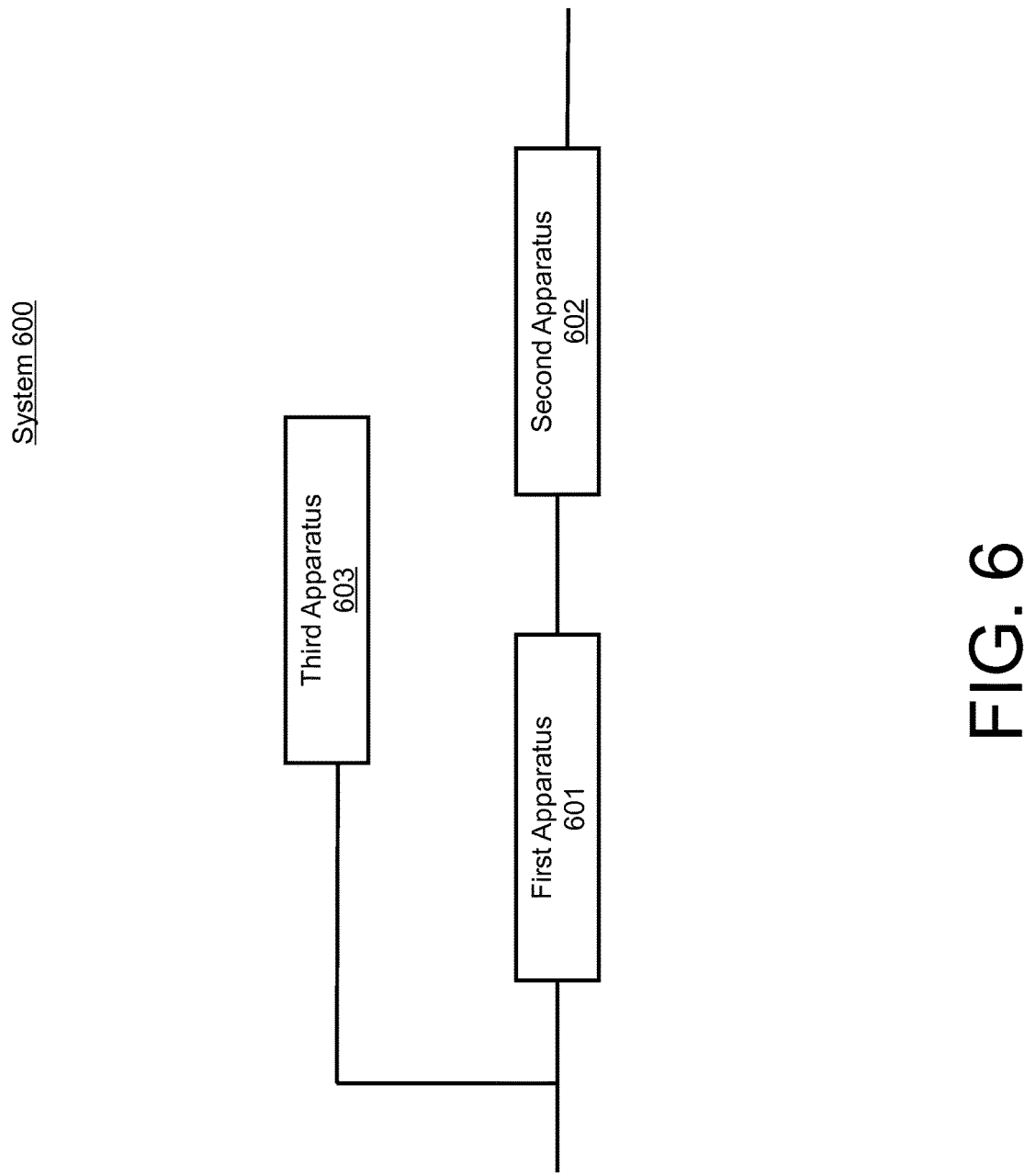
FIG. 6 depicts another block diagram of an apparatus for detecting consistency between data replicas according to an embodiment of the present invention.

Turning now to FIG. 6, a system 600 including a first apparatus 601, a second apparatus 602, and a third apparatus 603 for detecting consistency between data replicas stored based on key-value according to a second embodiment of this invention is depicted. The first apparatus 601 and the second 602 are similar to the first apparatus 301 and the second apparatus 302 of the system 300. The third apparatus 603 is configured to perform an erroneous detection correcting operation periodically.

The method and apparatus of the embodiments above have a low probability of erroneous detection. Erroneous detection can comprise determining inconsistent replicas as consistent, or contrarily determining consistent replicas as inconsistent. One reason of the former may be any conflict between the characteristic information, i.e., different replicas with the same characteristic information. However, because the characteristic information is associated with various keys contained in the replica and different keys are assigned by the system for different data entries in the data replica as their unique IDs, it hardly happens to two data replicas to have exactly identical keys, but different data entries. Therefore, such conflict has a negligible occurrence probability (e.g., in the order of 1 out of a billion). The latter can be because of time difference between updating of replicas. However, through making a detection based on a predetermined threshold value of the number of determination times, the probability of such erroneous detection may be substantially negligible. Even in the case of an erroneous detection happened, its cost (for example, causing a data recovery operation) is generally acceptable. Thus in the various embodiments, it is acceptable to do nothing for the erroneous detection.

However, to further improve detection accuracy, the above embodiments include an erroneous detection correcting operation that can be performed according to a predetermined period. This correcting operation can be periodically performed independent of the detection operations of blocks 501-502 (e.g., the first apparatus 601 and the second apparatus 602) to force any probable erroneous detection corrected.

In an example, the erroneous detection operation can comprise: comparing, at predetermined periodic intervals, data entries in the first data replica and that of the second data replica one by one, to determine consistency between the first data replica and the second data replica. This one-by-one data comparison can substantially guarantee with a 100% probability the accuracy of the consistency detection, such that in the case of any probable erroneous detection, the previous detection result can be corrected according to the result of the one-by-one comparison, or an data recovery operation can be performed on the replicas, wherein the data recovery operation may comprise updating an inconsistent replica to its updated version.

In another example, the erroneous detection operation can further comprise performing, according to a predetermined period, a data recovery operation on the first and second data replicas. That is, in this example, without any detection or determination, the data recovery operation can be directly performed on data replicas periodically, such that any probable erroneous detection in previous detection can be corrected.

The longer the predetermined period, the smaller influence the predetermined period may have on the normal operations of the system, but with a larger occurrence probability of erroneous detection. The length of the predetermined period can be selected as needed.

The above embodiments illustrate methods and apparatuses for detecting consistency between two data replicas. The above embodiments can also be configured to include methods and apparatuses for detecting consistency among more than two data replicas of the same data block. In one example, the operations of the method and apparatus of the various embodiments may be performed on every two data replicas among multiple data replicas corresponding to the same data block. In another example, the data recovery operations may be performed on multiple data replicas if inconsistency has been detected among the multiple data replicas, wherein any criteria may be used for determining inconsistency among multiple data replicas as required, e.g., a predetermined number of data replicas inconsistent with a reference replica among the multiple data replicas can be taken as an indication of such inconsistency. Also, the data recovery operations may be selected as required.

Technical effects and benefits include efficient and accurate online detection of replica consistency without affecting the normal operations of a storage system. Thus, embodiments described herein are necessarily rooted in the above noted systems (e.g., computer system/server 12) to perform proactive operations to overcome problems specifically arising in the realm of data storage (e.g., these problems include the inconsistent and unreliable data, resulting in unwanted costs and expenses).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In view of the above, embodiments of the present invention may include a method for detecting consistency between data replicas stored based on key-value. The method comprises acquiring characteristic information of a first data replica and a second data replica respectively, the characteristic information being associated with keys of a respective data replica and representative of the data replica; determining, based on a predetermined threshold value of the number of determination times, whether the characteristic information of the first data replica is identical to the characteristic information of the second data replica; and confirming that the first data replica is detected as consistent with the second data replica in response to determining the characteristic information being identical where the number of determination times not being more than the predetermined threshold value.

According to another embodiment or according to the method above, the determining, based on a predetermined threshold value of the number of determination times, whether the characteristic information of the first data replica is identical to the characteristic information of the second data replica can further comprise, in response that the characteristic information has never been determined to be identical till the number of determination times has reached the predetermined threshold value, confirming that the first data replica is detected as inconsistent with the second data replica.

According to another embodiment or according to any of the methods above, the determining, based on a predetermined threshold value of the number of determination times, whether the characteristic information of the first data replica is identical to the characteristic information of the second data replica can further comprise: in response to determining the characteristic information not identical where the number of determination times not being more than the predetermined threshold value, re-executing the step of acquiring characteristic information of a first data replica and a second data replica respectively.

According to another embodiment or according to any of the methods above, the characteristic information can be the sum of hash values obtained by hashing the keys of the respective data replica.

According to another embodiment or according to any of the methods above, the re-executing the step of acquiring characteristic information of a first data replica and a second data replica respectively, and the determining, based on a predetermined threshold value of the number of determination times, whether the characteristic information of the first data replica is identical to the characteristic information of the second data replica can further comprise re-executing the step of acquiring characteristic information of a first data replica and a second data replica respectively after a predetermined waiting time.

According to another embodiment or according to any of the methods above, the method can comprise comparing, according to a predetermined period, data entries of the first data replica and that of the second data replica one by one, to detect consistency between the first data replica and the second data replica.

According to another embodiment or according to any of the methods above, the method can comprise performing, according to the predetermined period, a data recovery operation on the first data replica and the second data replica.

Embodiments of the present invention may include a system for detecting consistency between data replicas stored based on key-value. The system comprises a first apparatus configured to acquire characteristic information of a first data replica and a second data replica respectively, the characteristic information being associated with keys of a respective data replica and representative of the data replica; a second apparatus configured to determine, based on a predetermined threshold value of the number of determination times, whether the characteristic information of the first data replica is identical to the characteristic information of the second data replica; and confirm that the first data replica is detected as consistent with the second data replica in response to determining the characteristic information being identical where the number of determination times not being more than the predetermined threshold value.

According to another embodiment or according to the system above, the second apparatus can be further configured to, in response that the characteristic information has never been determined to be identical till the number of determination times has reached the predetermined threshold value, confirm that the first data replica is detected as inconsistent with the second data replica.

According to another embodiment or according to any of the systems above, the second apparatus can be further configured to: in response to determining the characteristic information not identical where the number of determination times not being more than the predetermined threshold value, re-execute the operations of the first and second apparatus.

According to another embodiment or according to any of the systems above, the characteristic information can be the sum of hash values obtained by hashing the keys of the respective data replica.

According to another embodiment or according to any of the systems above, the re-execute the operations of the first and second apparatus can comprise, after a predetermined waiting time, re-execute the operations of the first and second apparatus.

According to another embodiment or according to any of the systems above, the system can comprise a third apparatus configured to compare, according to a predetermined period, data entries of the first data replica and that of the second data replica one by one, to detect consistency between the first data replica and the second data replica.

According to another embodiment or according to any of the systems above, the system can comprise a fourth apparatus configured to perform, according to the predetermined period, a data recovery operation on the first data replica and the second data replica Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operation in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods and computer program products according to various embodiments of the present invention. In this regard, each block in the flowchart or block diagrams may represent a module, segment, or portion of code, which comprises one or more executable instructions for implementing the specified logical operation(s). It should also be noted that, in some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting consistency between first and second data replicas, the method comprising:
   acquiring first characteristic information of a first data replica and second characteristic information of a second data replica, the first and second characteristic information being associated with keys of the respective first and second data replicas;
   determining, based on a predetermined threshold value of a number of determination times, whether the first characteristic information is identical to the second characteristic information of the second data replica to confirm the consistency between the first and second data replicas; and
   re-executing the acquiring of the first and second characteristic information and the determining of whether the first characteristic information and the second characteristic information are identical in response to the determining that the first characteristic information and the second characteristic information are not identical,
   wherein the number of determination times is not more than the predetermined threshold value,
   wherein the first and second characteristic information are hash value sums obtained by hashing the keys of the respective first and second data replicas,
   wherein the re-executing is performed after a predetermined waiting time.

2. The method according to claim 1, further comprising:
   comparing, according to a predetermined period, each of the first data entries of the first data replica and each of the second data entries of the second data replica one by one, to detect the first data replica is consistent with the second data replica.

3. The method according to claim 1, further comprising:
   performing, according to a predetermined period, a data recovery operation on the first data replica and the second data replica.

4. A computer program product, the computer program product comprising a computer readable storage medium having program instructions for detecting consistency between first and second data replicas embodied therewith, the program instructions executable by a processor to cause the processor to perform:
   acquiring first characteristic information of the first data replica and second characteristic information of the second data replica, the first and second characteristic information being associated with keys of the respective first and second data replicas;
   determining, based on a predetermined threshold value of a number of determination times, whether the first characteristic information is identical to the second characteristic information of the second data replica to confirm the consistency between the first and second data replicas; and
   re-executing the acquiring of the first and second characteristic information and the determining of whether the first characteristic information and the second characteristic information are identical in response to the determining that the first characteristic information and the second characteristic information are not identical,
   wherein the number of determination times is not more than the predetermined threshold value,
   wherein the first and second characteristic information are hash value sums obtained by hashing the keys of the respective first and second data replicas,
   wherein the re-executing is performed after a predetermined waiting time.

5. The computer program product according to claim 4, the program instructions further executable by the processor to cause the processor to perform:
   comparing, according to a predetermined period, each of the first data entries of the first data replica and each of the second data entries of the second data replica one by one, to detect the first data replica is consistent with the second data replica.

6. The computer program product according to claim 4, the program instructions further executable by the processor to cause the processor to perform:
   performing, according to a predetermined period, a data recovery operation on the first data replica and the second data replica.

7. A system for detecting consistency between first and second data replicas, comprising:
   a first apparatus comprising a first processor and a first memory and configured to acquire first characteristic information of the first data replica and second characteristic information of the second data replica, the first and second characteristic information being associated with keys of the respective first and second data replicas; and
   a second apparatus comprising a second processor and a second memory and configured to:
      determine, based on a predetermined threshold value of a number of determination times, whether the first characteristic information is identical to the second characteristic information of the second data replica to confirm the consistency between the first and second data replicas,
      re-executing the acquiring of the first and second characteristic information and the determining of whether the first characteristic information and the second characteristic information are identical in response to the determination that the first characteristic information and the second characteristic information are not identical,
   wherein the number of determination times is not more than the predetermined threshold value, wherein the first and second characteristic information are hash value sums obtained by hashing the keys of the respective first and second data replicas, wherein the re-executing is performed after a predetermined waiting time.

8. The system according to claim 7, the second apparatus being further configured to:

compare, according to a predetermined period, each of the first data entries of the first data replica and each of the second data entries of the second data replica one by one, to detect the first data replica is consistent with the second data replica.

9. The system according to claim 7, the second apparatus being further configured to:

perform, according to a predetermined period, a data recovery operation on the first data replica and the second data replica.

* * * * *